Patented Nov. 30, 1948

2,455,337

UNITED STATES PATENT OFFICE 2,455,337

ADDITION AGENT FOR LUBRICANTS

William A. Jones, Ponca City, Okla., assignor to Continental Oil Company, Ponca City, Okla., a corporation of Delaware No Drawing. Application August 7, 1945, Serial No. 609,489

4 Claims. (Cl. 252—56)

This invention relates broadly to lubricants and more particularly to addition agents for lubricants.

Many of the bearings in present day automobiles are of cadmium and copper-lead mixtures having a high lead content. Although these new bearing compositions possess certain mechanical advantages over the tin-babbit bearings, they are more susceptible to corrosion by oxidation and decomposition products formed in the lubricating oil. Moreover, modern internal combustion engines operate at higher speeds and temperatures which subjects the lubricating oil to harsher conditions of use. As a consequence, less deterioration of the oil can be tolerated without danger of bearing failure.

An oil to be used in the crankcase of a modern high-speed, high-temperature engine must have a high viscosity index, a low pour point and must be relatively free from sludge formation. These advantages can only be obtained by drastic refining. However, this renders the oil susceptible to easy oxidation and the consequential formation of highly corrosive compounds. To correct the bad effects of drastic refining, inhibitors are added which prevent or greatly decrease the tendency of the oil to oxidize. By preventing oxidation, they also prevent the formation of products corrosive to the new type bearing metals.

An important object of my invention is to provide an inhibitor for lubricating oil that will reduce oxidation of the oil and the attendant acid and sludge formation so harmful to the metallic parts of the engine.

Another object of my invention is to provide an addition agent for lubricating oil that will improve the film strength of the oil.

Still another object of my invention is to provide an addition agent for lubicating oil that will increase the unctuosity or oiliness characteristics of the oil.

Other objects and advantages of my invention will be apparent during the course of the following description.

The addition agent embodying my invention is the esterified acidic and saponifiable resinous substances accumulated on adsorbent material during the clarification of petroleum oils.

The material which is esterified in the practice of my invention is the resinous substances accumulated on adsorbent material during the final step in refining relatively high viscosity index mineral base lubricating oils. It is blended with hydrocarbon lubricating oil after esterification and with or without sulfurization.

The oils, from which I obtain resins suitable for the production of the material found to be valuable, are mineral oil fractions of petroleum having viscosities (Saybolt Universal) from about 50 seconds at 100° F. to about 200 seconds at 210° F. and viscosity indices of not less than 80.

The resins suitable for the practice of this invention are obtained durng the process of refining fractions of petroleum of lubricating viscosity by percolating the oil through a bed of solid adsorbent material. The adsorbent material may be silica gel, activated charcoal, alumina, adsorbent clay, or other material of like characteristics. After a sufficient amount of oil has been percolated through a bed of the adsorbent material, the adsorbent material becomes saturated with resins and no more will be adsorbed from the oil. The resin coated adsorbent is freed of oil by washing with petroleum naphtha which does not remove the resins. The peroleum naphtha is removed from the resin coated adsorbent by blowing with air. The resins are removed from the adsorbent material by washing with chloroform or a solvent consisting of fifty per cent benzene and fifty per cent ethyl alcohol or other suitable solvent. The solvent is removed from the resins by distillation. The resins should not be heated above 220° F. during this process.

The resins obtained by this process are brown, stringy, viscous liquid to semi-solid matter. Their exact chemical composition is unknown and certainly varies depending upon the different crude oil sources and different methods and degrees of refining to which the oil fraction has been subjected prior to resin removal. The resins contain varying amounts of acidic compounds and have neutralization numbers of from three to ten or higher. They also contain saponifiable compounds and have saponification numbers of from five to twenty-five or higher. Their oxygen content ranges from five-tenths per cent to five per cent or more. Their sulfur content ranges from three-tenths per cent to six per cent or more. Usually some nitrogen is present. It is probable that a considerable part of their composition consists of high molecular weight hydrocarbons. It is not intended to limit the resins suitable for the practice of this invention to any particular set of physical characteristics or chemical composition other than the limitations that they contain negligible amounts of naphthenes and naphthenic acids which is insured by the use of only those resins adsorbed from oil fractions of lubricating viscosity having a viscosity index of not less than 80.

The alcohol used for esterifying the resin may be any compound having a hydroxyl group that will react with the acidic and saponifiable matter of the petroleum resin to form an ester. I have found that low-molecular weight alcohols such as methyl, ethyl, and propyl are entirely satisfactory; and the esters formed by these alcohols are preferred examples of my invention. However, the higher molecular weight alcohols can be used, and the alcohol may be either aliphatic or aromatic. Primary alcohols react more readily with the resins than the secondary alcohols and the secondary alcohols, in turn, react more readily than tertiary alcohols.

The following table sets forth a number of suitable alcohols:

I. Aliphatic alcohols
    *a.* Methyl
    *b.* Ethyl
    *c.* n-propyl
    *d.* Isopropyl
    *e.* Butyl
    *f.* Normal butyl
    *g.* Primary isobutyl
    *h.* n-amyl
    *i.* Secondary butyl carbinol
    *j.* n-hexyl
    *k.* Heptyl
    *l.* Octyl
    *m.* Nonyl
    *n.* Decyl II. Aromatic alcohols
    *a.* Benzyl
    *b.* Phenyl ethyl alcohol
    *c.* Phenyl methyl carbinol
    *d.* Phenol
    *e.* Cresol The esterification reaction may be carried out by any of the known methods of esterification. An example of a procedure which I use is as follows: Two and one half parts by weight of methyl alcohol are admixed with one part by weight of resin. It is important that this mixture be homogeneous before proceeding with the reaction since masses of the resin not broken up and mixed with the alcohol are changed to less oil soluble materials by heating. The mixing is usually done with a mechanical mixer. Five milliliters of concentrated hydrochloric acid per liter of mixed resin and alcohol are added as a catalyst to promote the reaction. The container of this mixture is fitted with a reflux condenser and placed in an oil bath maintained at 210° F. This heating is continued for three hours after the mixture reaches its boiling temperature. Local over heating should be avoided. In cases in which other alcohols are used the temperature of the heating bath should be twenty to thirty degrees Fahrenheit above the boiling temperature of the particular alcohol.

The time for the reaction to reach equilibrium may be shortened by the use of increased temperature and pressure in a closed system. In the example given, a pressure of twenty pounds per square inch will insure equilibrium of the reaction within one hour. The temperature of the heating bath is regulated to maintain the desired pressure.

After the esterification reaction has reached equilibrium, the excess alcohol, water formed by the reaction, and hydrochloric acid are removed by distillation. This distillation is conducted at atmospheric pressure until the major portion of these materials has been removed. Removal of the small amounts remaining is accomplished by distillation under reduced pressure. Heating for the distillation is accomplished by the oil bath maintained at the same temperature as was used for the esterification reaction. It is interesting to note that the resin in its natural state polymerizes, forming gums, lacquers and sludges; but when it has been esterified it no longer condenses or polymerizes.

A lubricant treated by the addition of 2 per cent of an ester produced by reaction of the resin and methyl alcohol was surprisingly resistant to oxidation. Moreover, when heated to extremely high temperatures for extended periods in the presence of oxygen, it proved to be noncorrosive to the readily corroded metals.

When 2 per cent of an ester produced by reacting a resin from a Mid-Continent oil with benzyl alcohol was added to a highly refined lubricant, the viscosity index of the lubricant was lowered slightly and its resistance to acid and sludge formation was markedly improved.

In general, the esters increase the protective action of oils in metal surfaces and particularly steel surfaces. It is possible, by the addition of as little as .01 per cent of the ester, to improve remarkably the qualities of a lubricant in respect to resistance to oxidation, film strength, anticorrosiveness, and oiliness.

I have found that if the ester is sulfurized, it increases the film strength of the lubricant and further reduces the tendency of the oil to oxidize and form corrosive acids and sludge. The resin can be sulfurized before it is esterified or the ester, itself, can be sulfurized. I prefer to sulfurize the ester rather than the resin. The sulfurization may be by sulfur compounds such as phosphorus sulfides, alkali metal polysulfides or by elemental sulfur. Any known method of sulfurizing can be employed, but I prefer to heat a mixture of the ester and elemental sulfur to a temperature of between 260° F. and 300° F. Satisfactory results are obtained if 6 per cent by weight of sulfur is used. The temperature and heating period can be varied to regulate the stability of the sulfur in the molecule. The longer reaction time and the higher temperature produce compounds having relatively stably bound sulfur. This type of compound is preferred for use in crankcase lubricants. Shorter reaction periods and lower temperatures form compounds having the sulfur less stably bound. The compounds having less stably bound or relatively active sulfur can be used in lubricants for metallic parts not readily corroded by free sulfur and are extremely valuable in combination with hydrocarbon lubricating oil as cutting oils or lubricants used in machining metals or cutting threads.

It is to be understood that the above examples are preferred embodiments of my invention and that they are to be considered as illustrations and not as limitations.

The ability of an ester to decrease the pour point of the lubricant and to inhibit oxidation of the oil is also enhanced by halogenation. The ester may be halogenated by any of the well known methods. A preferred method is to react the ester with approximately 10 per cent of a halogen such as chlorine at a temperature of 250° F. to 260° F. at atmospheric pressure. This temperature is maintained during the halogenation by circulating the ester through a cooler to dissipate the heat of reaction.

In addition to the above, I have discovered that the properties of my esters are further enhanced by the presence of other types of organic compounds. Engine tests on blends of lubricating oil containing this esterfied resin or sulfurized esterified resin and from 0.1 to 5 per cent of any of the organic phosphorus compounds show a beneficial synergistic action between the resin products and the organic phosphorus compounds. Reduction in both sludge and varnish or lacquer formation, reduction in deposits of engine dirt, reduction in bearing corrosion, reduction in iron corrosion and rusting and stability of the lubricating oil to oxidation are all enhanced to a far greater extent than can be achieved by the use of blends of lubricating oil containing only one of these materials. Halogen compounds also have such an improving effect. In general, any halogen or phosphorus bearing organic compound having a vapor pressure of less than atmospheric at 140° C. is suitable as an auxiliary agent to my esterified resins. Examples of suitable auxiliary compounds are, chlorinated paraffin wax, chlorinated octadecanol, dichloropropyl ether, chlorobutyrone, octadecyl trichloroacetal, methyl dichlorostearate, chlorotolylstearamide, chloro-oleyl amine chlor-oleyl amide, calcium dichlorostearate, borium derivative of a tertiary amyl phenol sulfide, pentachlorodiphenyl, a chlorinated wax-naphthalene condensation product containing residual chlorine, trichlorodiphenyl ether, chlorodiphenylene oxide, chlorophenyl stearic acid, o-chloracetophenone, chlorobenzophenone, pentachlorophenylbenzoate, chlorobenzanilide, chlorophenyl phosphate, chlorophenyl phosphite, chlorophenyl phosphine, phosphazine, phosphanilide, phosphazobenzene, phosphorus isothiocyanide, phosphoryl isothiocyanide, triphenyl phosphite, and tributyl phosphate.

While my addends are primarily for use as addition agents for highly refined mineral oils, they are admirably adapted for use in all types of oil of lubricating viscosity, including those designated for use in automotive crankcases, Diesel oils, hydrogenated, polymerized, and otherwise synthetically-treated oils such as voltolized oils, aluminum chloride treated oils, and the like. Furthermore, the lubricating oil may consist in whole or in part of shale oil, lard oil, corn oil, or cottonseed oil. Soap-thickened mineral oils of all types, ranging from those showing only a slight increase in viscosity over that of the mineral oil alone to the semi-solid and solid greases containing fifty per cent or more of soap, are amenable to treatment according to my invention. In making these greases, the usual soaps such as sodium stearate, aluminum stearate, calcium soaps of cottonseed oil fatty acids, and the like may be used to form the larger part of the necessary soap. Various other thickening ingredients or materials for other purposes may be added. These include yarn, hair, graphite, glycerol, water, lamp black, mica dust, litharge, and the like.

Although the foregoing description sets forth preferred embodiments of my invention, it will be readily apparent to those skilled in the art that variations and modifications and combinations may be made therein without departing from the spirit of the invention.

This application is a continuation-in-part of copending application Serial No. 491,555, filed June 19, 1943 (now abandoned).

Other modes of applying the principle of the invention may be employed, change being made as regards the details described, provided the features stated in any of the following claims or the equivalent of such be employed.

I, therefore, particularly point out and distinctly claim as my invention:

1. A lubricating composition comprising a major proportion of an oil of lubricating viscosity and from about .01% to 10% of the product produced by contacting with a solid adsorbent a petroleum oil substantially free of naphthenes and naphthenic acids, having a S. S. U. viscosity within the range of about 50 seconds at 100° to about 200 seconds at 210° F. and a viscosity index of not less than 80, washing the adsorbent material with naphtha, dissolving from the adsorbent material the resinous material deposited thereon which is soluble in chloroform, and esterifying such recovered resinous material with an organic hydroxy compound selected from the class consisting of alcohol and phenol.

2. A lubricating composition comprising a major proportion of an oil of lubricating viscosity and from about .01% to 10% of the product produced by contacting with a solid adsorbent a petroleum oil substantially free of naphthenes and naphthenic acids, having a S. S. U. viscosity within the range of about 50 seconds at 100° F. to about 200 seconds at 210° F. and a viscosity index of not less than 80, washing the adsorbent material with naphtha, dissolving from the adsorbent material the resinous material deposited thereon which is soluble in chloroform, esterifying such recovered resinous material with an organic hydroxy compound selected from the class consisting of alcohol and phenol and then sulphurizing the esterified product by treating the same at an elevated temperature with a material selected from the class consisting of elemental sulphur, the phosphorus sulphides and the alkali metal polysulphides.

3. A lubricating composition comprising a major proportion of an oil of lubricating viscosity and from about .01% to 10% of the product produced by contacting with a solid adsorbent a petroleum oil substantially free of naphthenes and naphthenic acids, having a S. S. U. viscosity within the range of about 50 seconds at 100° F. to about 200 seconds at 210° F. and a viscosity index of not less than 80, washing the adsorbent material with naphtha, dissolving from the adsorbent material the resinous material deposited thereon which is soluble in chloroform, esterifying such recovered resinous material with an organic hydroxy compound selected from the class consisting of alcohol and phenol and then sulphurizing the esterified product by treating the same at an elevated temperature with elemental sulphur.

4. A lubricating composition comprising a major proportion of an oil of lubricating viscosity and from about .01% to 10% of the product produced by contacting with a solid adsorbent a petroleum oil substantially free of naphthenes and naphthenic acids, having a S. S. U. viscosity within the range of about 50 seconds at 100° F. to about 200 seconds at 210° F. and a viscosity index of not less than 80, washing the adsorbent material with naphtha, dissolving from the adsorbent material the resinous material deposited thereon which is soluble in chloroform, esterifying such recovered resinous material with an organic hydroxy compound selected from the class consisting of alcohol and phenol and then sulphurizing the esterified product by treating the same at an elevated temperature with a phosphorus sulphide.

WILLIAM A. JONES.

REFERENCES CITED

The following references are of record in the file of this patent:

UNITED STATES PATENTS

| Number | Name | Date |
|---|---|---|
| 2,037,563 | Curtis | Apr. 14, 1936 |
| 2,173,117 | Johnson | Sept. 19, 1939 |
| 2,195,131 | Kapp | Mar. 26, 1940 |
| 2,224,541 | Frolich | Dec. 10, 1940 |
| 2,298,670 | Alleman | Oct. 13, 1942 |
| 2,331,244 | Strichland | Oct. 5, 1943 |
| 2,378,813 | Walker | June 19, 1945 |